United States Patent Office 2,734,649
Patented Feb. 14, 1956

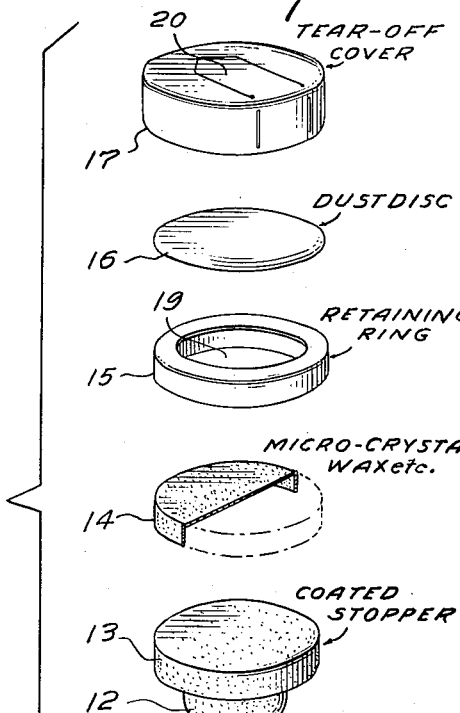
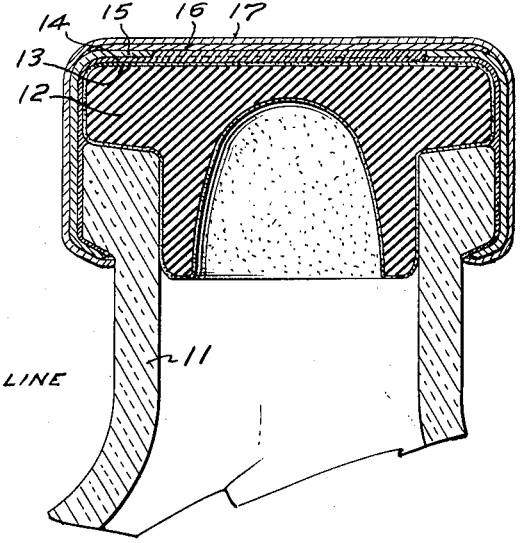
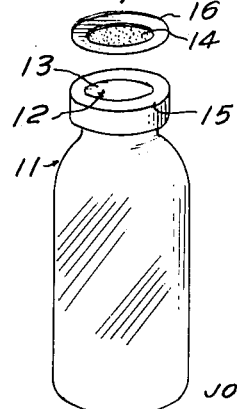

2,734,649

MOISTUREPROOF VIAL CLOSURE

John Charles Callahan, Blauvelt, and Walter John Rumpf, Pearl River, N. Y., assignors to American Cyanamid Company, New York, N. Y., a corporation of Maine Application April 5, 1952, Serial No. 280,734

12 Claims. (Cl. 215—37)

This invention relates to a closure for a bottle or vial containing moisture-sensitive materials, and a method for closing such bottles or vials. It relates particularly to a puncturable rubber or synthetic rubber stopper having on its surface a coating of a lubricant-like material such as a silicone oil, and a moisture-proof barrier over this lubricant layer which may be of microcrystalline wax, and a 3-piece metal seal enclosing the barrier layer and adherent to it so that when the metal seal is opened the barrier layer is removed from the stopper.

It is an object of our invention to provide a method of closing bottles which is economical and convenient to use and which exhibits a higher degree of moisture impermeability than has been previously conveniently obtainable in a puncturable closure.

It is an additional object of our invention to provide a closure such that the bottle may be readily opened and the contents used, either at once, or over a period of time.

It is a further object of our invention to provide a closure such that the moisture-proof layer will be removed when a dust disc is removed.

A moisture-proof closure is required for many types of products. Products such as those which are frozen and dried, sometimes referred to as "lyophilized," and certain other types of products, particularly pharmaceutical products, are stable only if kept free from moisture. Ordinarily a rubber stopper in a glass bottle is regarded as a water-proof closure. While water-proof, it is known that a rubber stopper is not moisture-proof. For this reason, many frozen-dried products have been sealed in all-glass ampoules. Such types of closures are not desirable because fragments of glass may fall into the container when it is opened; the entire contents must be used at once, and it is difficult to provide for their slow draining through a tube for injection. A puncturable rubber stopper is much more convenient as it permits the vial to remain sealed, so that the contents stay sterile, and may be used over a period of time. By rubber stopper we include stoppers of both natural and synthetic rubbers and mixtures thereof.

In the past, various attempts have been made to secure a practical moisture-proof closure. For example, A. E. Smith, U. S. Patent No. 1,718,590 discloses a rubber cap over which there is a paraffin coating. However, he finds it desirable to insert a fused foil disc inside of this closure. Others, such as Reichel, Patent No. 2,085,392 have used a puncturable rubber stopper on which there is a layer of wax, under which is shown a strip of adhesive tape to assist in the removal of the wax. This same inventor later shows in U. S. Patent 2,176,004 an ampoule in the neck of which a rubber stopper is inserted and over the rubber stopper is an all-glass seal, thus providing an all-glass moisture-proof seal. Variations on this type of seal are shown in a U. S. patent to Barr, 2,372,182 which provides for a turn-down skirt on the rubber stopper inside the sealed glass enclosure so that when the glass neck is broken, the rubber skirt can be turned over the sharp edges. Another approach to the problem is shown in the U. S. patent to Flosdorf, 2,283,867, in which a rubber-stoppered bottle is enclosed in a metal container together with a desiccant.

Rather than these complicated and expensive methods for closing a bottle and protecting moisture-sensitive contents, we have invented a comparatively simple and inexpensive closure which provides a remarkably high degree of moisture resistance, certain embodiments of which are shown in the drawings:

Figure 1 shows an exploded view of our closure.

Figure 2 shows dipping the stoppered bottle in melted barrier layer.

Figure 3 shows a cross-section of a preferred embodiment of our invention.

Figure 4 shows how a portion of the barrier layer adheres to and is removed with the dust disc.

Any size of vial or bottle with any relative size of opening may be closed with our new closure. It is very convenient for the one-liter bottles containing dried blood plasma as well as for 20 cc. vials containing individual doses of moisture-sensitive materials such as Aureomycin Glycinate or other frozen-dried products. Larger or smaller bottles may be used as may bottles of materials other than glass, such as ceramics or plastics such as polyethylene.

In the drawings, as illustrative, a small glass bottle or vial 11 is shown. In this is placed a stopper 12 on which is a lubricant coating 13. The stopper itself may be of natural rubber or synthetic rubber or of mixtures thereof. Standard rubber stoppers of the puncturable type which are sold commercially are normally used. These stoppers as purchased may be coated with a lubricant material.

We prefer to use a silicone coating such as is obtained by dipping or spraying the stoppers with a solvent solution of the silicone, such as is described in U. S. Patent 2,573,637 to Bender, or a similar type of coating which may be placed on the stoppers by immersing them in or spraying them with an aqueous dispersion of a silicone. The lubricant coating may be formed by material incorporated in the rubber stopper. For example, castor oil, etc. may be milled into the rubber at the time the stopper is made. Other materials such as glycerin, zinc stearate, talc or mold release agents used to assist in the release of the rubber stoppers from their forming dies may in part or in whole function as the lubricant coating on the rubber stopper. We prefer to apply the lubricant coating to the stopper before insertion, as it aids in the insertion. It may, however, be applied after the stopper is in the bottle.

We find that the silicone coating is economical and particularly efficient as it not only serves as a lubricant coating to assist in causing the moisture barrier to separate from the stopper, but also prevents the stoppers from sticking to each other during sterilization, and causes them to feed more easily through automatic plugging machinery. The plugging operation may be sterilely conducted or the plugged bottles including contents may be sterilized by heat or otherwise after the plugging operation.

A moisture-proof barrier layer 14 is then placed over the lubricant-coated stopper. The moisture-proof barrier layer may be applied by spraying or brushing the molten material, but we prefer to dip the bottles in an inverted position into a melted bath for a sufficient distance to coat at least the end of the stopper and preferably all of the stopper and at least part of the lip on the bottle.

If partial moisture-proofing is adequate, the moisture-proof barrier layer may be applied to only part of the stopper. The puncturable portion of the stopper is the thinnest, and accordingly most permeable to moisture. If only the top surface is to be coated, rollers or sprays may be used to apply the moisture-proof barrier layer. We prefer to dip the stoppered bottle, as this also insures the adequacy of the stopper to bottle seal.

Figure 2 shows the dipping operation. The dipping operation may be conducted manually or automatically.

As a moisture-proof barrier layer, we prefer microcrystalline wax. A layer of a material such as paraffin or beeswax is not moisture proof. Paraffin has been used for many years for moisture resistance but it is not sufficiently moisture resistant for our purposes. Waxes such as paraffin consist of a group of comparatively large crystals and the moisture can penetrate between them. The materials known as microcrystalline waxes are distinguished from paraffin waxes because they have small indistinct crystals and tend towards ill-formed crystals. This gives a tacky or resinous feel. Surprisingly these waxes are a remarkably good moisture barrier in very thin layers. We prefer a microcrystalline wax which has a melting point between about 160 and 190° F. Waxes which melt below 160° F. may melt in box cars or other hot storage areas and microcrystalline waxes which melt above 190° F. may be so brittle as to fracture in cold weather. Of course, if the service conditions are unusual, a wax melting above or below this range may be more suitable for the particular unusual conditions encountered.

For application the wax may be melted and kept slightly above its melting point and the bottle inverted and dipped therein. At higher temperatures, the wax becomes thinner and more than one dip is required to obtain a desired thickness of wax film. At the lower temperatures, a single dipping operation gives excellent results.

We prefer a coating of between about .015 and .075 of inch for our microcrystalline wax. If the wax is too thin, it may not give adequate moisture resistance and is difficult to remove from the stopper. If it is too thick it again becomes difficult to remove and the cost is unnecessarily high. We prefer a wax which melts in the range of about 170 to 275° F. which is tacky at room temperatures, does not easily fracture under handling and will adhere to the dust disc which assists in the removal of the wax as later described. The wax can be coated on the closure at a lower temperature if diluted with a suitable solvent and the solvent allowed to evaporate before subsequent processing. The moisture-proof barrier layer may be sprayed or brushed on or applied with rollers, if such machinery is available. Other tacky waxes or synthetic resins which possess the characteristics of microcrystalline wax in being higher moisture resistant in thin layers and which will adhere to the dust disc and separate away from the stopper may be substituted for the microcrystalline wax when commercially available at a competitive price.

After the microcrystalline wax has set, normally a matter of but a few seconds, a retaining seal may be placed over the wax coated stopper. We prefer a 3-piece metallic seal which is normally made of aluminum, although other metals or metal substitutes may be used. Commercially this seal comes in a single assembly so that all three pieces may be placed on the vial at one time and crimped thereto by an automatic crimping machine.

The 3-piece seal consists of a retaining ring 15 which is crimped around and holds the stopper in position in the bottle and prevents its accidental removal. It insures that the contents of the bottle are free from contamination and permits the puncturing of the stopper with a hypodermic needle without the risk of the stopper being withdrawn with the needle.

Over the retaining ring is a dust disc 16 which may be either a flat plate or a cup-shaped cap which partially covers the sides of the retaining ring 15. Both of these types are commercially available and may be used. Over the dust disc is a tear-off cover 17 which is crimped around both the dust disc and the retaining ring and fixes the dust disc in position. The tear-off cover is so shaped with zones of weakness that it may be torn from the bottle readily. Various types of such closures are commercially available. A tear strip 20 aids in such removal. When the tear-off cover is removed, the dust disc is found to be adherent to the moisture-proof barrier layer and as shown more particularly in Figure 4, the portion of this moisture-proof barrier which is exposed by the hole 19 in the retaining ring adheres to and is removed with the dust disc. Because the moisture-proof barrier layer is thus removed, a clean surface of the stopper is presented to the needle which is forced through the stopper. Other removable protective means may be used to protect the moisture-proof barrier layer from physical damage during handling and shipment, and also function to remove the moisture-proof barrier layer from the exposable surface of the stopper when the bottle is made ready for use. If the wax or other material were permitted to remain on the stopper, when a hypodermic needle was shoved through the stopper, a small core would be very apt to clog the needle and render it inoperable. It is very important that the moisture-proof barrier separate readily, and preferably pull free with the dust disc.

We prefer that the hole in the retaining ring be of a comparatively large size so that a larger area of the moisture-proof barrier layer can adhere to the dust disc. For a 20 millimeter closure we prefer a 9/16" hole. The lubricant layer is necessary to prevent the moisture-proof barrier layer from adhering to the stopper, although as above mentioned, the lubricant itself may be compounded in the stopper at the time of its formation. If too thin a layer of moisture-proof barrier layer is used, it may tear loose from the dust disc and adhere to the stopper. We prefer to use a thickness of from about .015 to .075 of an inch of a microcrystalline wax layer, which is sufficiently sturdy so that it will adhere to the dust disc and fail by shear around the periphery of the opening in the retaining ring rather than by bending, and will thus remain integral and adhere to the dust disc as is shown in Figure 4. It is not necessary that the thickness be uniform. If too small an opening is used in the retaining ring or too thick a layer of microcrystalline wax, the microcrystalline wax layer may be strong enough so that it will tear free from the disc, a possibility which is avoided by employing our preferred construction.

The metal seal should be firmly emplaced on the stoppered bottle and we prefer to use about as much pressure on the head of the automatic closing machine as the bottles will stand to insure that the retaining ring is pulled down on the stopper sufficiently to firmly hold it in position and cause the stopper to slightly bulge in the center, which bulging assists in causing the microcrystalline wax layer to break free when the dust disc is removed.

As an operating example, a group of commercial rubber plugs were dipped in a 2% aqueous dispersion of a silicone emulsion sold by Dow-Corning as DC–35A, removed, shaken for approximately one minute, and then heated in a drying oven at 110° C. for 10 hours, which both dried and sterilized the plugs. A group of 20 cc. glass vials were filled with a mixture of aureomycin hydrochloride and sodium glycinate. The filling operation was conducted sterilely and the silicone coated plugs were inserted in the vials sterilely. A bath 18 of microcrystalline wax having a melting point between 170 and 175° F. as sold by the Bareco Oil Company as their Be Square 170–175 grade, and white in color, was maintained at a temperature of 190° F. The inverted plugged vials were dipped by hand twice into the wax to build up a coating of approximately 1/32 of an inch, which coating covered the exposed part of the stopper and part of the rim of the vial, but not the underside of the rim. The wax cooled almost immediately and a 3-piece aluminum seal with a dust plate was placed on the stoppered vial by an automatic sealing machine adjusted towards the upper limits of head pressure. The thus sealed vials were found to be storage stable and to stand normal shipping temperatures without the wax becoming either too soft or too brittle. On opening by removing the tear-off cover and lifting off the dust disc, it was found that the microcrystalline wax adhered to the dust disc and was torn free from the stopper leaving a smooth edge around the edges of the hole in the retaining ring. The center of the stopper was exposed, and could be sterilized and punctured by a physician using a small hypodermic needle without any danger of the wax plugging the needle.

On test, one of these vials containing an initial moisture content of 0.38% was stored for two weeks at 95% relative humidity and 37° C. On opening after this time, there was found to be no discernible change in moisture content. An identical vial sealed and stored under the same conditions except that the stopper was not coated with the microcrystalline wax was found to have a moisture content of 1.59%.

Microcrystalline wax is tacky, and would be objectionable if exposed to contact in handling. In our closure, the microcrystalline wax is completely shielded from view, and contact, and is protected from damage during shipment and storage. It is present when needed, but removed and discarded without being noticeable when the bottle is being prepared for use.

It accordingly appears that the moisture barrier as herein described, for the first time makes possible the economical use of puncturable rubber stoppers with moisture sensitive products.

Additional experiments showed that red neoprene stoppers as sold in commerce frequently have sufficient oil placed on them by the manufacturer that an additional lubricant layer is not required to cause the microcrystalline wax to break free in nearly all instances. A higher percentage of satisfactory removals is obtained with silicone coatings.

Having thus described certain embodiments thereof, as our invention we claim:

1. A method of sealing a bottle containing a moisture-sensitive material which comprises covering a stopper with a lubricant coating, inserting the stopper in the bottle, applying a liquefied moisture-resistant hardenable material to the stoppered end of the bottle, permitting the moisture-proof barrier layer thus formed to harden and securing the stopper in the bottle with a metallic retaining seal.

2. A method of sealing a bottle containing a moisture-sensitive material which comprises covering a stopper with a lubricant coating, inserting the stopper in the bottle, dipping the stoppered end of the bottle into a liquefied bath of a moisture-resistant hardenable material, permitting the moisture-proof barrier layer thus formed to harden, and securing the stopper in the bottle with a metallic retaining seal comprising a retaining ring and a removable dust disc.

3. A method of sealing a bottle containing a moisture-sensitive material which comprises silicone coating a stopper, inserting the stopper in the bottle, dipping at least the stoppered end of the bottle into a bath of melted microcrystalline wax, permitting the microcrystalline wax moisture-proof barrier layer thus formed to at least partially cool, and securing the stopper in the bottle with a metallic retaining seal comprising a retaining ring, a dust disc and a tear-off cover.

4. A method of sealing a bottle containing a moisture-sensitive material which comprises dipping at least the stoppered end of a silicone-coated stopper closed bottle into a bath of melted microcrystalline wax, permitting the microcrystalline wax moisture-proof barrier layer thus formed to at least partially cool, and securing the stopper in the bottle with a metallic retaining seal comprising a retaining ring and a removable protective dust disc.

5. A method of sealing a bottle containing a moisture-sensitive material which comprises inserting a lubricant-coated stopper in the bottle, applying a liquefied moisture-resistant hardenable material to the stoppered end of the bottle, permitting the moisture-proof barrier layer thus formed to harden, and securing the stopper in the bottle with a metallic retaining seal.

6. The method of claim 3 carried out under conditions such that the contents of the bottle remain sterile during the sealing procedure.

7. The method of claim 4 carried out under conditions such that the contents of the bottle remain sterile during the sealing procedure.

8. A closure for a bottle containing a moisture-sensitive material which comprises a lubricant-coated stopper, a moisture-proof barrier layer of microcrystalline wax with a melting point of between 160 and 190° F., covering at least the major portion of the exposed surface of the stopper and readily separable therefrom, and a retaining ring securing the stopper to the bottle.

9. A closure for a bottle containing a moisture-sensitive material which comprises a silicone-coated stopper, a microcrystalline wax moisture-proof barrier layer covering at least the major portion of the exposed surface of the stopper, a stopper retaining the ring securing the stopper in the bottle, and a dust disc adjacent to the stopper and adherent to the microcrystalline wax moisture-proof barrier layer through a hole in the stopper retaining ring.

10. A closure for a bottle containing a moisture-sensitive material which comprises a silicone-coated stopper, a microcrystalline wax moisture-proof barrier layer covering at least the major portion of the exposed surface of the stopper, a stopper retaining ring securing the stopper in the bottle, a dust disc adjacent to and adherent to the microcrystalline wax moisture-proof barrier layer through a hole in said stopper retaining ring, and a tear-off protective cover secured to the bottle which retains said dust disc in position.

11. A closure for a bottle containing a moisture-sensitive material which comprises a silicone-coated stopper for a glass bottle, a microcrystalline wax moisture-proof barrier layer covering at least the major silicone-coated portion of the exposed surface of the stopper, and a stopper retaining ring securing the stopper to the bottle, and a removable protective means adjacent to the stopper and adherent to the moisture-proof barrier layer through the hole in the retaining ring.

12. A closure for a bottle containing a moisture-sensitive material which comprises a silicone-coated stopper for a glass bottle, a microcrystalline wax moisture-proof barrier layer covering at least the major silicone-coated portion of the exposed surface of the stopper, and a stopper retaining ring securing the stopper to the bottle, and a dust disc adjacent to the stopper and adherent to the moisture-proof barrier layer through the hole in the retaining ring.

References Cited in the file of this patent

UNITED STATES PATENTS

| | | |
|---|---|---|
| 2,138,741 | Kronquest | Nov. 29, 1938 |
| 2,085,392 | Reichel | June 29, 1939 |
| 2,191,495 | Nesset | Feb. 27, 1940 |
| 2,387,439 | Graybus, Jr., et al. | Oct. 23, 1945 |
| 2,430,459 | Farrell | Nov. 11, 1947 |
| 2,573,637 | Bender | Oct. 30, 1951 |
| 2,647,513 | Holmes | Aug. 4, 1953 |

FOREIGN PATENTS

| | | |
|---|---|---|
| 585,392 | Great Britain | Feb. 6, 1947 |

OTHER REFERENCES

Technical Bulletin, Socony-Vacuum Oil Co., Inc., 26 Broadway, New York, N. Y. (12 pages), August 1944.
World Petroleum (pages 55–57), October 1945.